United States Patent [19]

Jenkins et al.

[11] 4,220,098
[45] Sep. 2, 1980

[54] RAILWAY CAR DOOR CRANK ACTUATING MECHANISM

[75] Inventors: Oliver J. Jenkins, Youngstown; William D. Mundinger, Canfield, both of Ohio

[73] Assignee: The Youngstown Steel Door Company, Cleveland, Ohio

[21] Appl. No.: 839,825

[22] Filed: Oct. 6, 1977

[51] Int. Cl.$^2$ .................. B60J 5/08; B61D 19/00; E05D 15/10
[52] U.S. Cl. .................................. 105/378; 49/219
[58] Field of Search .................. 49/220, 218, 219; 105/378; 403/270, 271, 272

[56] References Cited

U.S. PATENT DOCUMENTS

| | | | |
|---|---|---|---|
| 2,997,752 | 8/1961 | Henrikson et al. | 49/219 X |
| 3,179,986 | 4/1965 | Madland | 49/220 |
| 3,269,059 | 8/1966 | Bailey | 49/219 |
| 3,386,205 | 6/1968 | Herr | 49/220 |
| 3,797,170 | 3/1974 | Lemon | 49/220 |
| 3,913,269 | 10/1975 | Ross, Jr. | 49/220 |

OTHER PUBLICATIONS

AAR Mech. Div. Man. of Stands. & Rec. Prac. (Adptd. 1965 Rev. 1968, 1974, 1975).
AAR Sub-Comm. No. III Mtg. Rep. (Sprfld. MO on Oct. 7, 1976) at p. 2.

*Primary Examiner*—Howard Beltran
*Attorney, Agent, or Firm*—John H. Mulholland

[57] ABSTRACT

A rail house car with at least one opening along each of its sides. The car includes a door for closing each of the openings by movement of the doors longitudinally along the car sides and laterally into and out of the openings. Bottom and top rotating crank members moveably support and retain the doors on longitudinal tracks below the doors and within longitudinal retainer means above the doors. At least some of the crank members are selectively manually driven by rotational means for selective lateral movement of the doors. The top crank members adjacent the upper portion of the doors each include a bore. A forged pin is telescopingly received in each of a plurality of pipes rotationally mounted on the door. Each pin has a shank portion and an upper headed or flanged portion. Each crank member's bore is counterbored to receive the headed portion of a pin. Substantially the entire periphery of the shank portion is welded to its associated crank member and only a portion of the flange formed by the head of the pin is welded to the crank member counterbore. This minimizes deterioration of the strength given to the pin flange by the forging operation. Alternatively, the head can be spaced from the top of the crank member and only the shank portion welded to it. The crank mount is also for use with any auxiliary crank members which are in engagement with the longitudinal retaining means of the car. A pin or weld or both can secure the extension pin and pipe to prevent relative rotation therebetween.

8 Claims, 8 Drawing Figures

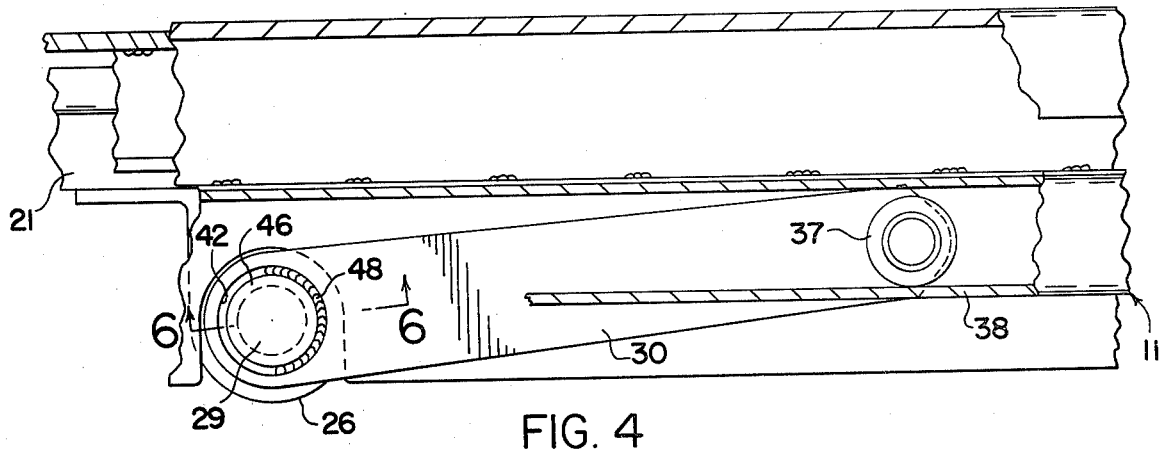
FIG. 4
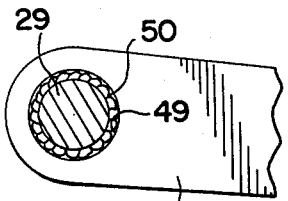
FIG. 5
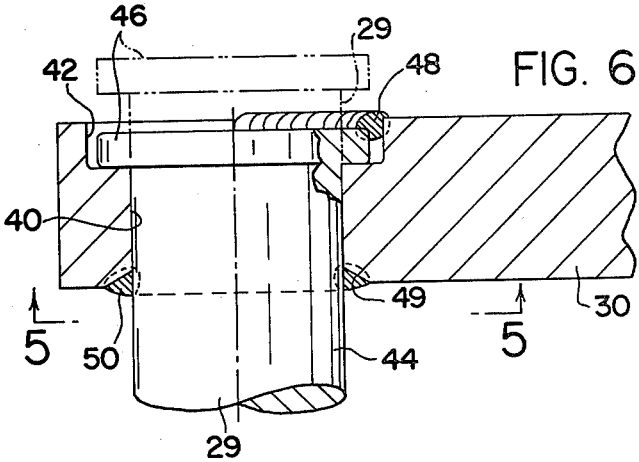
FIG. 6
FIG. 7 (PRIOR ART)
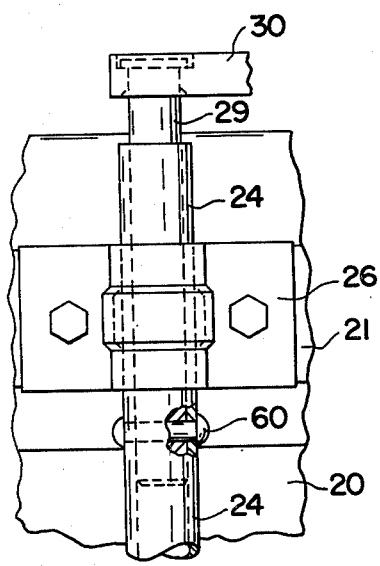
FIG. 8
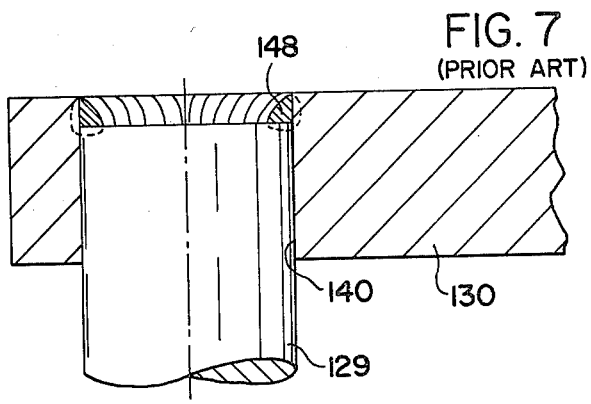

RAILWAY CAR DOOR CRANK ACTUATING MECHANISM

BACKGROUND OF THE INVENTION

The invention relates to rail house cars with openings along their sides. The cars include doors for closing the openings by movement of the doors longitudinally along the sides and laterally into and out of the openings. The invention can be used in cars of the type known as rail house cars, including box cars, cars having four or more door openings along each side and special high-cube box cars having two door openings on each side.

There are two basic types of railroad car doors, the sliding type door and the plug type door. The present invention relates to plug type doors wherein bottom and top rotating crank means moveably support and retain the doors on longitudinal tracks below the doors and within longitudinal retainer means above the doors. Auxiliary crank means are also provided at the top door edges.

Typically, there are operating cranks opposite each other on the top and bottom edges of the door with the top crank being in association with a longitudinal retainer means and the bottom crank being in association with a longitudinal track means. These aligned cranks are tied together for unitary angular operation by means of connection pipes and pipe extensions which may be selectively manually driven by various mechanical means such as levers, rack and pinion combinations, push rods and clevises, etc. In any of the types of plug doors involved, the movement of the cranks creates the lateral movement of the door into and out of the door opening, the door being "plugged" into the opening when it is laterally in the opening and free to move along the track and retainer longitudinally of the car when it is not in the "plugged" condition.

Heretofore connection pipes have had top operating crank members mounted thereon by means of a bore in the crank member through which a connection pipe extension upwardly protrudes substantially to the top. A weld was provided around the top of the extension member generally within the upper portion of the bore. In these prior art situations if the weld should happen to break at the welded connection of the crank member and pipe extension it was possible for the extension to fall downwardly out of the bore of the crank thereby leaving the top portion of the door disconnected from the upper crank and the longitudinal retaining means with which it was associated.

The present invention was devised to minimize the possibility of a separation of the crank from the top connection pipe extension member. The novel means for accomplishing this will be easily discerned from the drawings and the description of the invention.

BRIEF DESCRIPTION OF THE INVENTION

The invention relates to the attachment between a top crank member and a connection pipe extension whereby if a welded connection therebetween should break the door will still be attached to the car because of the head interference with the crank. In plug type doors of rail house cars wherein the generally horizontal extending top crank members are retained by and adapted for longitudinal relative motion by a longitudinal retaining means, the cranks are attached to pipes by means of connection pipe extensions. The connection pipes are manually selectively driven to rotationally drive the cranks and thereby move the doors laterally into and out of their respective openings. It is important that the mount of the crank on the connection pipe extension be and remain secure so that in the event of damage to the track and or hanger adjacent the lower portion of the door the longitudinal retaining means by means of the crank and extension mount can support the door adequately. For the purposes of this invention, it is not important whether rollers, roller skid combinations or skids alone are mounted on the end of the crank member in association with the longitudinal retaining means. The connection on the opposite or outer end and the mounting of the crank on the connection pipe extension at that end is what is concerned.

In accordance with the illustrated embodiment of the invention, the upper end of the bore of the top crank members are preferably counterbored and a forged pin is telescopingly received in each of the connection pipes rotationally mounted on the door for driving the cranks. Each of the pins has a shank portion and an upper headed or flanged portion. Each crank member's counterbore receives one of the headed portions of a pin. Substantially the entire periphery of the shank portion is welded to its associated crank member and only a portion of the flange formed by the head of the pin is welded to the crank member to minimize deterioration of the strength given to the pin by the forging operation. Alternatively, only the shank portion may be welded to the crank member as long as the head prevents passage of the pin through the bore in the event of weld failure. The head may be spaced from the crank member to indicate the weld condition in the event of a failure. The crank mount is also associated with any auxiliary crank members which are in engagement with the longitudinal retaining means of the car. A pin or weld, or both, can secure the headed extension and connection pipe together to prevent relative rotation therebetween and to provide the necessary integral structure for rotationally driving the crank members by means of the pipes. Increased strength of the rail house car door crank mount is thus provided by this novel invention.

BRIEF DESCRIPTION OF THE DRAWINGS

FIG. 4 is a cross-sectional view taken along the line 4—4 of FIG. 2.

FIG. 5 is a cross-sectional view taken along the line 5—5 of FIG. 6.

FIG. 6 is a cross-sectional view taken along the line 6—6 of FIG. 4 with an alternative mode of the invention shown in phantom.

FIG. 7 is a view similar to FIG. 6 illustrating a prior art connection not embodying the principles of this invention.

FIG. 8 is a view similar to FIG. 2 illustrating an alternative manner of mechanically connecting the connection pipe and headed extension of this invention.

DETAILED DESCRIPTION OF THE INVENTION

Figure 1:
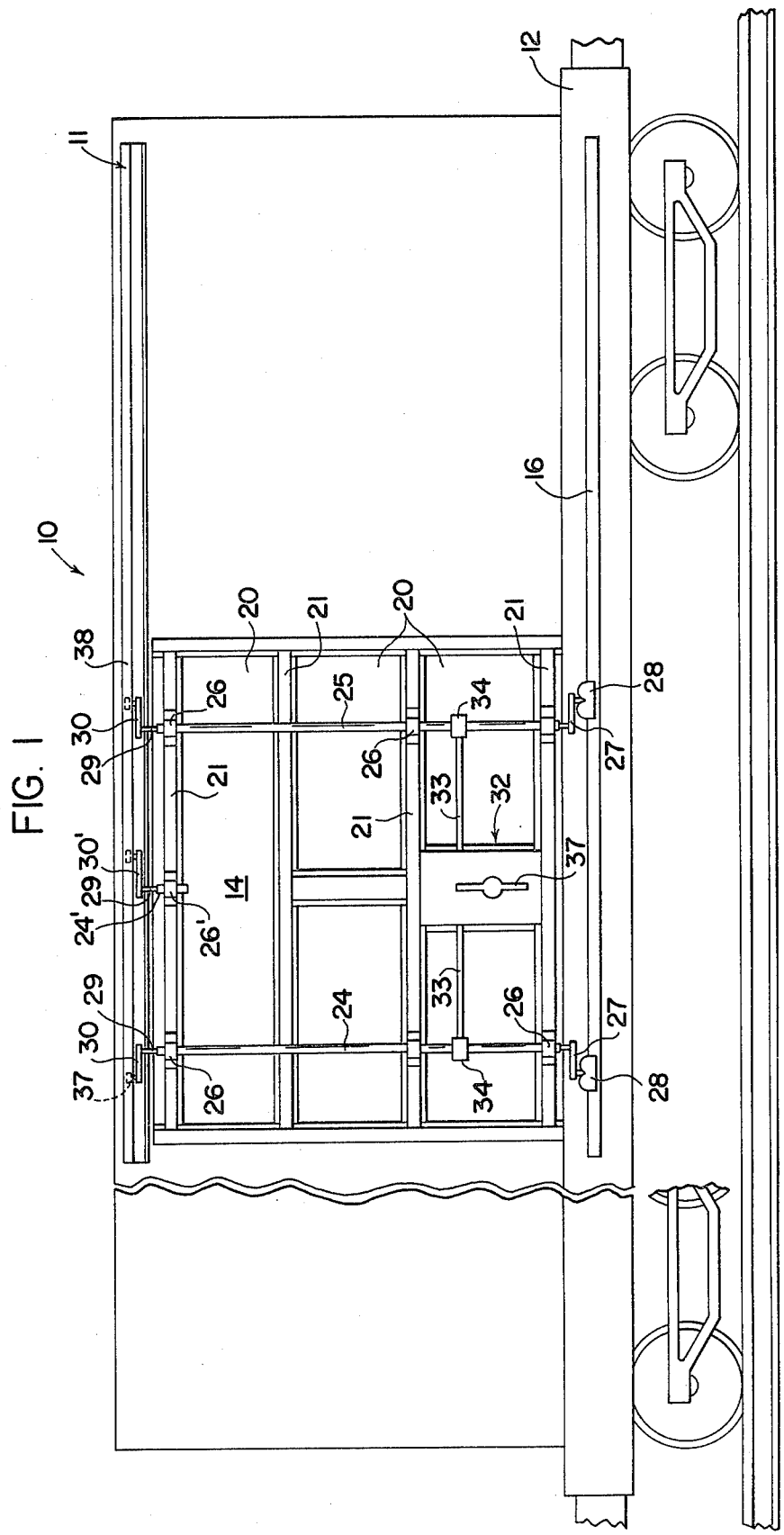
FIG. 1 is a side elevational view of a rail house car having an opening in its side and a plug type door having top operating cranks and an auxiliary crank member attached to headed connection pipe extensions in accordance with the principles of this invention.

As can be seen in FIG. 1, a rail house car is generally designated by the numeral 10. The rail house car illustrated is a common box car having a single door opening and plug type door generally designated by the numeral 14. Plug type door 14 includes top, center and bottom panels or sheeting 20 reinforced by horizontal channels 21 at the top and bottom thereof, as well as across the center of the door. The rail house car 10 includes a longitudinal retaining means generally designated by the numeral 11 and a side sill 12 each of which extends substantially along the length of the car.

The door 14 rides on a track means 16 and is capable of lateral movement into and out of the opening in the side of the car by means of a pair of pipes 24 and 25 which are rotationally secured to the face of the door through appropriate brackets or fulcrums 26. The bracket or fulcrum 26' supports an auxiliary crank assembly 30'. The pipes 24 and 25 include upper and lower generally horizontal crank means disposed at or near each of their ends. Lower rotatable cranks 27 have roller equipped hanger means 28 at their ends which support the doors on track 16. Each of the pipes 24 and 25 also have top operating crank members 30. The auxiliary crank assembly 30' is connected to its connection pipe 24' in the same manner that crank member 30 is connected to pipe 24, the details of which will be explained hereinafter and make up the subject of this invention.

The operating mechanism is generally designated by the numeral 32 and includes an operating handle 36 which is drivingly connected thereto for angular movements of the pipes 24 and 25 in a manner such that the doors may be moved laterally into and out of the opening. The mechanism 32 is a gear segment type device such as is well known in the art. Rods 33 and clevises 34 make connections between mechanism 32 and the pipes 24 and 25 for driving the pipes and their associated cranks 27 and 30.

Figure 2:
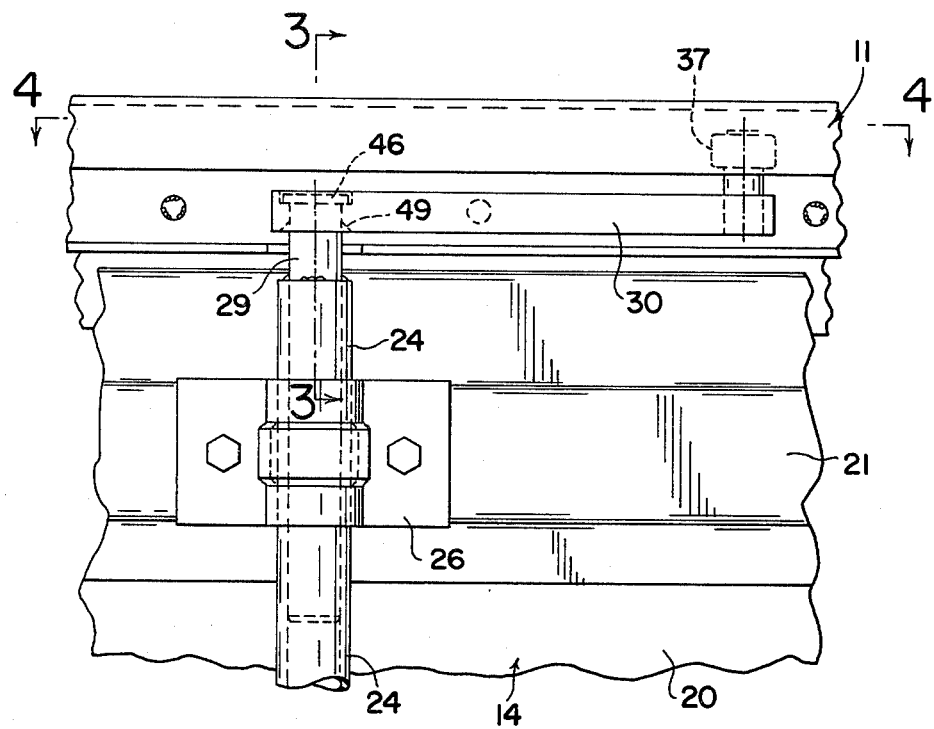
FIG. 2 is a detailed fragmentary elevational view of the pertinent portion of FIG. 1.
Figure 3:
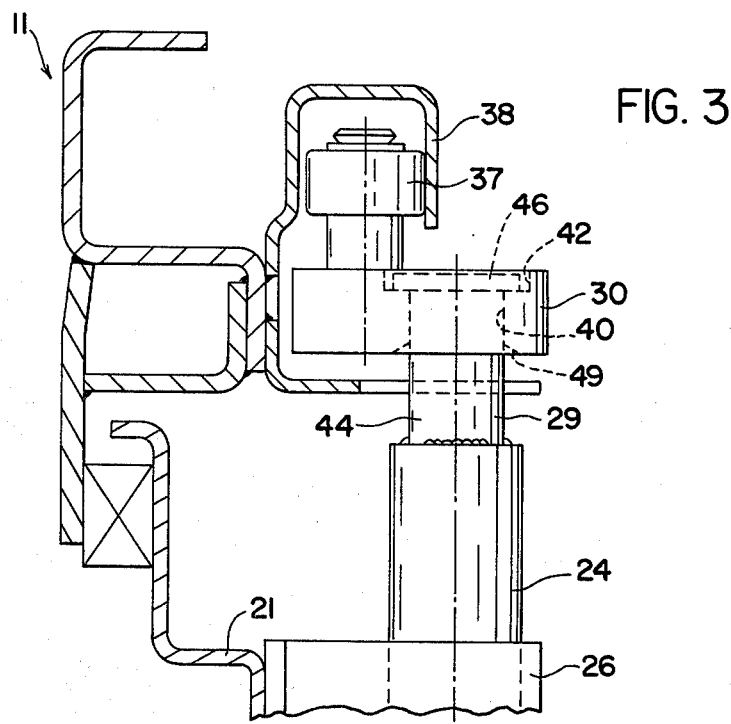
FIG. 3 is a cross-sectional view taken along the line 3—3 of FIG. 2.

With this operation of the car door in mind, a more complete description of the connection between the connection pipes 24 and 25 and their top operating cranks 30 will be given. Referring to FIG. 2, the pipe 24 extends up beyond fulcrum member 26 in which it is rotationally mounted. Fulcrum 26 is attached by means of carriage bolts or other suitable means to upper channel member 21. Crank 30 has for an anti-friction connection with the retainer structure 11 a roller 37. The roller could be a roller-skid combination means or could also be a pad or skid means on the inner crank end to provide for reduced friction between the inner surface of flange 38 of longitudinal retainer 11 and the crank member as it moves therealong.

On the outer end, that is the end opposite the roller 37 of crank 30, a bore 40 is provided. The bore 40 preferably has at the upper end thereof a counterbored portion 42. The bore and counterbore 40 and 42 receive forged headed pin 29. The forged headed pin 29 has a shank portion 44 and a head or peripheral flange forming portion 46. The flanged portion 46 is preferably seated within the counterbore 42 and welded approximately 180° therearound by means of welding material 48. On the lower end of the bore 40 a beveled portion 49 is provided into which a weld head 50 is deposited to weld the shank portion 44 of the forged pin 29 to the crank member 30. The weld bead 50 extends 360° around the shank portion. The reason that the weld bead at the headed end welding the flange portion 46 to the crank member 30 is less than 360° is to keep the amount of heat from the welding process to a minimum thereby avoiding destroying the inherently strong and characteristic forging structure of the flanged portion 46. This retains a maximum amount of strength at the headed end so that in the event the weld should fail the pin 29 will still be retained and blocked from sliding downwardly through the bore 40 of the top operating crank 30 or the auxiliary crank 30'.

The advantage of this structure can be seen by observing FIG. 7 wherein a prior art method of connection between a horizontal top operating crank and a common connection pipe extension pin is illustrated. In the prior art case of FIG. 7, the horizontal crank member 130 has a bore 140 into which is received a pin 129. The pin 129 is cylindrical as is the bore 140. The pin 129 does not extend to the top surface of the top operating crank 130 of the prior art and the weld bead 148 is deposited 360° around the top of the pin in the cavity formed by the end of the pin 129 with the top cylindrical surface of the bore 140. It can be seen that should the prior art weld 148 fail, the pin 129 would be free to fall from the bore 140 of the prior art top operating crank 130 with no further mechanical obstruction. The increased advantage of the novel forged pin 29 of the invention should be apparent from this illustration of the prior art device.

FIG. 8 illustrates a connection embodiment utilizing a two-headed pin or rivet 60 to prevent relative motion between the pipe 24 and the forged headed extension pin 29. The pin 60 can be used in conjunction with, or instead of, the weld 50 between the shank portion 44 of forged pin 29 and the top operating crank 30.

A further embodiment of the invention may be seen illustrated in phantom in FIG. 6 whereby the flanged portion 46 is illustrated in a raised position. In this position, the head or flange member 46 will not be heated to deteriorate the strengthened forged structure of the flange since the mounting connection is made by two welds to the shank portion 44, one adjacent the top of the surface of the top operating crank 30 and the other adjacent the lower portion of the top operating crank 30 as shown at 50. The advantage of the position shown in phantom is that in the event of a weld failure, the movement of the head portion 46 into contact with the top of the top operating crank 30, or a counterbore if such is provided in this instance, will be discernable to the eye. This would indicate to an inspector that a maintenance problem exists.

Thus, it will be seen that an improved mechanical attachment between the connection pipes and the top operating crank members is provided, which is also suitable for use on the auxiliary crank assembly.

What is claimed is:

1. In a rail house car having at least one opening along each of its sides,
   a door for closing each of said openings by movement along said car sides and laterally into and out of said openings,
   bottom and top rotating crank members moveably supporting and retaining said doors adjacent the lower portions of said doors on longitudinal track means and adjacent the upper portions of said doors within longitudinal retainer means, means to rotationally drive at least some of said crank members for selective lateral movement of said doors, the improvement comprising:

said top crank members adjacent the upper portion of said doors each including a bore having received therein an upward extension means of an elongated member rotationally mounted on said door, said bore being counterbored at its uppermost end, said upward extension means including a shank portion and further including a flanged portion with an annular flange dimensioned and located such that it is within the counterbore of said bore, said shank portion being welded to said crank member, and said flanged portion being welded to said crank member.

2. The rail house car of claim 1 in which the elongated members are pipes drivingly connected to some of the crank members and said upward extension means are headed pins.

3. The rail house car of claim 2 in which said headed pins and said pipes are secured against relative rotational movement by means of welds.

4. The rail house car of claim 2 in which said headed pins are telescopingly received in said pipes and said pipes and said pins are secured against relative rotational movement by means of rivets.

5. The rail house car of claim 2 in which said flanged portions of said pins are forgings which include characteristic internal forged structure and strength.

6. The rail house car of claim 5 in which the shank portion has a weld means of sufficient peripheral extent to provide the necessary torque to effect operation of said crank member.

7. In a rail house car having at least one opening along each of its sides, a door for closing each of said openings by movement along said car sides and laterally into and out of said openings, bottom and top rotating crank members moveably supporting and retaining said doors adjacent the lower portions of said doors on longitudinal track means and adjacent the upper portions of said doors within longitudinal retainer means, means to rotationally drive at least some of said crank members for selective lateral movement of said doors, the improvement comprising:

said top crank members adjacent the upper portion of said doors each including a bore having received therein an upward extension means of an elongated member rotationally mounted on said door, said upward extension means including a shank portion and further including a flanged portion;

said shank portion being welded to said crank member and said flanged portion being of such an enlarged size and in such a location above said bore as to prevent said upward extension means from moving downwardly through said bore should said weld fail to hold said upward extension means and crank member together.

8. The rail house car of claim 7 in which said flanged portion is upwardly spaced from said crank member.

* * * * *